3,185,848
INFRARED RADIATION DETECTOR CELL UTILIZING IONIZED GAS

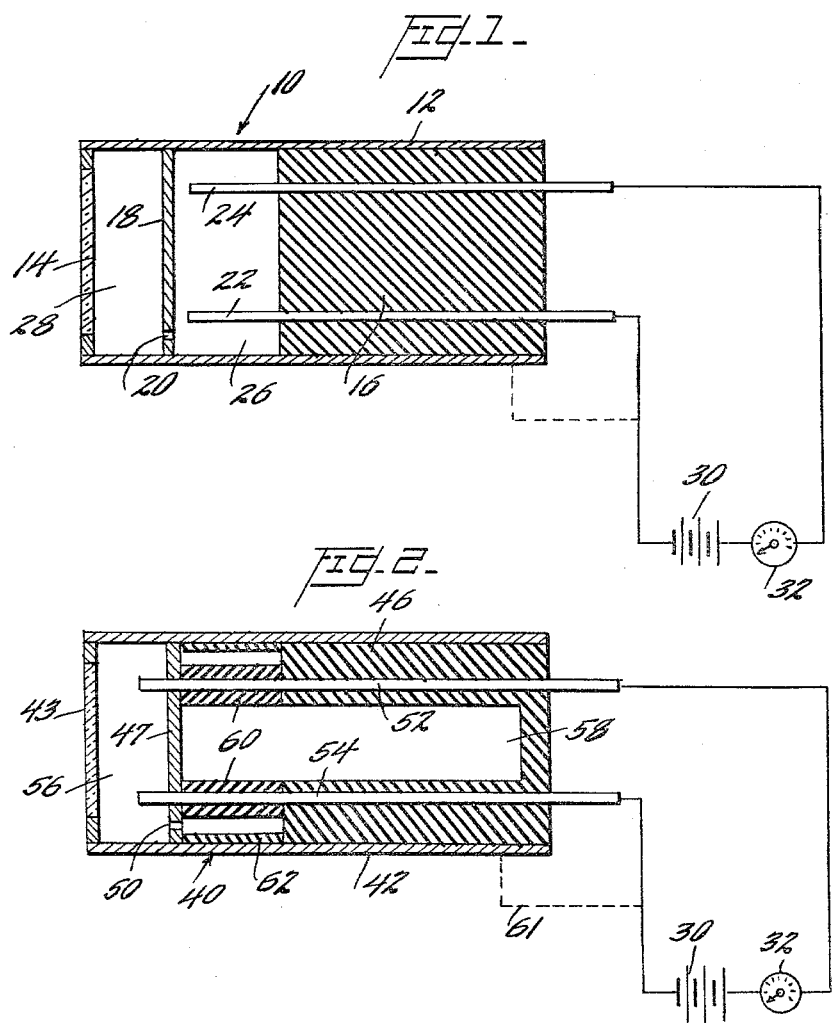

Laurence R. Alexander, Armonk, N.Y., assignor to Leesona Corporation, Warwick, R.I., a corporation of Massachusetts
Filed June 12, 1962, Ser. No. 201,898
10 Claims. (Cl. 250—83.6)

This invention relates to a new and improved apparatus for detecting electromagnetic radiation in the infrared range.

Infrared is an electromagnetic radiation having a wavelength in the range of about 0.7 micron to approximately 300 microns or, stated in another manner, it is radiation whose frequency is in the range of approximately 1 million to 500 million megacycles. This frequency range falls between that of visible light and the microwave region used for high definition radars. This radiation exhibits certain characteristics which closely resemble radio or radar waves and exhibits other characteristics which resemble those of visible light. Methods and apparatus for detecting infrared radiation are known in the art. For example, Peters Patent 2,867,792 and Johnson Patent 2,897,485 disclose devices for the detection of infrared radiation. I have discovered, however, that a distinct method and apparatus may be employed which utilizes other properties of the infrared radiation than those employed in the above mentioned patents.

Accordingly, it is an object of this invention to provide an improved infrared radiation detector.

It is a still further object of this invention to provide an improved infrared detector which is simple in construction and utilizes a minimum of parts.

Briefly, in accordance with aspects of this invention, an ionized gas is employed in an infrared detector cell and this ionized gas is subjected to infrared energy. When this energy is absorbed by the gas, the pressure of the gas increases due to an increase in temperature. This increased pressure of the gas causes a portion of the gas to be fed through an aperture in the gas chamber to a second chamber containing a pair of spaced electrodes. A potential is applied between the electrodes and the ionized gas provides a conducting path between the electrodes. The current flow through the gas is proportional to the amount of ionized gas in the electrode chamber and thus, the current flow is proportional to the amount of infrared energy absorbed by the ionized gas.

These and various other objects and features of the invention will be more clearly understood from a reading of the detailed description of the invention in conjunction with the drawing in which:

FIG. 1 is a combined pictorial and schematic representation of one illustrative embodiment of this invention, and FIG. 2 is a combined pictorial and schematic representation of another illustrative embodiment of this invention.

Referring now to FIG. 1 of the drawing, there is disclosed an infrared detector cell 10, shown in section, which includes a sealed container 12, which may advantageously be metal, a window 14 of material such as quartz or germanium which is transparent to the infrared energy, and an insulating plug 16 which defines the other end wall of the container. Between these two end walls is a partition 18 having an aperture 20 therein. A pair of electrodes 22 and 24 extend through the insulating plug 16 into chamber 26. The chamber 28 is defined between the window 14 and partition 18 is substantially filled with a gas which is ionized by the addition of a radioactive material such as krypton 85 or a small quantity of radium. If radium is employed, it will decay to radon (a gas), which is an alpha emitter. The radon will mix with the gas in the container and maintain an equilibrium condition.

This gas may be any convenient gas which is readily ionizable and a good absorber of infrared radiation. One such example of gas is carbon dioxide. Although two electrodes 22 and 24 are shown in the drawing, it is understood that one of the electrodes may be comprised by the outer wall 12. Thus, only one conductor rod, such as 22 and the outer wall 12, would provide the necessary electrodes. The opposite ends of electrodes 22 and 24 are connected to a suitable circuit which is illustrated in its simplest form as comprising a battery 30 and a meter 32 having a suitable scale to read the flow of current between the electrodes. This may advantageously be a micro-ammeter or a milli-ammeter depending on the particular concentration of ionized gas employed.

The operation of the system is somewhat as follows: The window 14 is positioned in the path of infrared energy. The ionized gas in chamber 28 absorbs the infrared radiation and the heat of this radiation causes the pressure of the gas in chamber 28 to increase. This increase in pressure causes ionized gas to pass through aperture 20 in partition 18 into the chamber 26. The increase in the quantity of ionized gas in chamber 26 decreases the resistivity of the path between the electrodes thereby causing the current flowing between the electrodes to increase. The meter 32 will therefore give a current reading which is proportional to the amount of ionized gas in the chamber 26. Since the amount of ionized gas has increased, the meter reading will indicate such increase. The difference in the meter reading under the two conditions, namely the one in which no radiation was received and the one in which radiation energy was received will be proportional to the amount of infrared energy absorbed by the gas.

Referring now to FIG. 2, there is depicted another illustrative embodiment of this invention which operates conversely to the embodiment of FIG. 1. In this embodiment, the cell 40 is comprised of a cylindrical member 42 which may be of metal and end wall 43 which is transparent to infrared energy, a plug 46 of insulating material and a partition 47 between the end wall 43 and the plug 46. The partition 47, which is of insulating material, has an aperture 50 therein to permit the passage of gases therethrough. Electrodes 52 and 54 extend through the plug 46 and the partition 47 into the chamber 56. In the other chamber 58 insulating cylinders 60 encircle electrodes 52 and 54 so that no conduction of electricity can take place between the electrodes in the chamber 58. The ionized gas is introduced into chamber 56 and as a result of the presence of this gas, conduction normally takes place between electrodes 52 and 54 in the chamber 56. When the infrared energy is directed through the transparent wall 43, the gas pressure increases and feeds gas through the passage 50 into the chamber 58. Because of the reduction in the number of molecules of gas in the chamber 56, the conduction between the electrodes 52 and 54 decreases. Accordingly, the meter 32 indicates this decrease in current.

The embodiment in FIG. 2 is a preferred embodiment, because it permits the volume of the chamber 56 to be much smaller than chamber 58, thereby allowing the gas in the front chamber 56 to expand into the large rear chamber 58 without creating a back pressure in chamber 58. Thus, relatively large changes in the current flow will take place from the same energy absorption of the two embodiments.

It is understood, of course, that if the container 42 is of metal, it may be employed as one of the electrodes merely by connecting the battery 30 to the container, as indicated by dotted line 61, and insulating the metallic container 42 from the gas in chamber 58 by means of an insulating annular ring 62. Under these circumstances, the electrode 54 may be eliminated.

While I have shown and described one illustrative embodiment of this invention and have defined one illustrative method, it is unerstood that the concepts thereof may be employed in other embodiments without departing from the spirit and scope of this invention.

What is claimed is:

1. An infrared detector cell comprising a sealed container, an infrared window defining at least a portion of one of the walls of said container, a partition in said container defining a pair of gas chambers, said partition having an aperture therein, an ionized gas in said chambers and a pair of electrodes positioned to receive the flow of electrons through the gas in said second chamber.

2. A system for detecting infrared energy, comprising a sealed container, a window defining a portion of one wall of said container which window is transparent to infrared radiation, a partition in said container positioned to define chambers on opposite sides thereof, said partition having an aperture therein to permit the passage of gas therethrough, an ionized gas in the chambers, a pair of electrodes in said second chamber and extending through one wall of said container, circuit means connected to said electrodes for establishing a potential between said electrodes and means for measuring the current between said electrodes, said current being proportional to the amount of infrared energy passing through said window.

3. A cell according to claim 1, wherein Kr 85 is placed in said one chamber to maintain ionization of said ionized gas.

4. A cell according to claim 1, wherein radium is placed in said one chamber to maintain ionization of said ionized gas.

5. An infrared detector cell comprising a sealed container, an infrared window defining at least a portion of one wall of said container, a partition within said container positioned to define a first and a second chamber in said container, said cell including a gas passage communicating with said chambers, an ionized gas in said chambers, a member transparent to infrared energy defining a portion of one wall of said first chamber and a first electrode positioned in said second chamber, said container including a metallic electrode member defining at least one wall of said second chamber whereby electron flow between said electrodes in response to the application of potentials thereto will be proportional to infrared energy passing through said window.

6. An infrared detector cell comprising a sealed container, an infrared window defining at least a portion of one of the walls of said container, a partition in said container defining a pair of gas chambers on opposite sides thereof, said partition having an aperture therein, an ionized gas in said chambers and a pair of electrodes positioned in one of said chambers.

7. An infrared detector cell according to claim 6, wherein said electrodes extend through said container into only one of the chambers.

8. A cell according to claim 7, wherein said electrodes extend through one of said chambers and into the other and wherein insulating material surrounds said electrodes in said one of said chambers, wherein current can flow from one electrode to the other through the ionized gas in only one of said chambers.

9. A system for detecting infrared energy comprising a sealed container, a window defining a portion of one wall of said container which window is transparent to infrared radiation, a partition in said container positioned to define chambers on opposite sides thereof, said partition having an aperture therein to permit the passage of gas therethrough, an ionized gas in the chambers, a pair of electrodes extending through said container into one of said chambers and means connected to said electrodes for establishing a potential between said electrodes and for measuring the current between said electrodes, whereby current flow between said electrodes is indicative of the amount of infrared energy passing through said window.

10. A system according to claim 9, wherein said electrodes extend through one of said chambers into the other of said chambers and wherein said electrodes are enclosed in insulation, wherein current can flow between said electrodes in only one of said chambers.

References Cited by the Examiner
UNITED STATES PATENTS

| | | | |
|---|---|---|---|
| 2,996,917 | 8/61 | Christoph | 250—43.5 X |
| 3,073,957 | 1/63 | Jones | 250—43.5 X |

RALPH G. NILSON, *Primary Examiner.*

ARCHIE R. BORCHELT, *Examiner.*